United States Patent [19]
Wycech

[11] Patent Number: 6,058,673
[45] Date of Patent: May 9, 2000

[54] INTERNAL REINFORCEMENT FOR HOLLOW STRUCTURAL ELEMENTS

[75] Inventor: Joseph S. Wycech, Grosse Pointe Woods, Mich.

[73] Assignee: Henkel Corporation, Gulph Mills, Pa.

[21] Appl. No.: 08/914,481

[22] Filed: Aug. 19, 1997

Related U.S. Application Data

[63] Continuation of application No. 08/644,389, May 10, 1996, abandoned.

[51] Int. Cl.[7] ........................................................ E04C 3/30
[52] U.S. Cl. ........................ 52/721.4; 52/729.1; 52/735.1; 52/795.1
[58] Field of Search ................................. 52/735.1, 736.1, 52/729.1, 721.4, 732.1, 790.1, 795.1

[56] References Cited

U.S. PATENT DOCUMENTS 245,798  9/1881  Driesslein .
4,019,301  4/1977  Fox .............................................. 52/725
4,751,249  6/1988  Wycech ...................................... 521/54
4,901,500  2/1990  Wycech ...................................... 52/793
4,908,930  3/1990  Wycech .................................. 29/527.2
4,978,562  12/1990  Wycech .................................. 428/35.8

OTHER PUBLICATIONS

Portland Cement Association, 13th ed.; "Design and Control of Concrete Mixtures", pp. 15–17.

Primary Examiner—Creighton Smith
Attorney, Agent, or Firm—Ernest G. Szoke; Wayne C. Jaeschke; Stephen D. Harper

[57] ABSTRACT

A reinforced beam has an internal I-beam structure with opposed adhesive foam layers. The foam layers are extruded, cut to length and placed on opposed surfaces of the I-beam. When the reinforced beam is heated, the adhesive layers expand to secure the I-beam in place.

54 Claims, 3 Drawing Sheets

INTERNAL REINFORCEMENT FOR HOLLOW STRUCTURAL ELEMENTS

CROSS REFERENCE TO RELATED APPLICATION

This application is a continuation of application Ser. No. 08/644,389 filed May 10, 1996 abd.

TECHNICAL FIELD

The present invention relates generally to reinforced structures for use in motor vehicles and, more specifically, relates to lightweight structures for reinforcing hollow structural elements.

BACKGROUND OF THE INVENTION

In a number of applications in the automotive industry, high-strength structural members with low mass are required. Various composite materials have been proposed in the past as structural members, such as exotic light-weight alloys. In most applications, however, mass reduction must not be at the expense of strength and must be balanced against the cost of the product to the consumer. Thus, there is a need for maintaining or, more preferably, for increasing the strength of structural members without significantly increasing materials and labor costs.

The reinforcement of motor vehicle structural members through the use of composite materials is also known. For example, the present inventor has disclosed a number of metal/plastic composite structures for use in reinforcing motor vehicles components. In U.S. Pat. No. 4,901,500, entitled "Lightweight Composite Beam," a reinforcing beam for a vehicle door is disclosed which comprises an open channel-shaped metal member having a longitudinal cavity which is filled with a thermoset or thermoplastic resin-based material. In U.S. Pat. No. 4,908,930 entitled, "Method of Making a Torsion Bar," a hollow torsion bar reinforced by a mixture of resin with filler is described. The tube is cut to length and charged with a resin-based material.

In U.S. Pat. No. 4,751,249, entitled, "Reinforcement Insert for a Structural Member with Method of Making and Using the Same," a precast reinforcement insert for structural members is provided which is formed of a plurality of pellets containing a thermoset resin with a blowing agent. The precast member is expanded and cured in place in the structural member, in U.S. Pat. No. 4,978,562, entitled, "Composite Tubular Door Beam Reinforced with a Syntactic Foam Core Localized at the Mid Span of the Tube," a composite door beam is described which has a resin-based core that occupies not more than one-third of the bore of a metal tube.

In U.S. Pat. No. 4,019,301, entitled, "Corrosion-Resistant Encasement For Structural Members," a piling or other structure is disclosed in which an I-beam is encased in a housing into which a resin is poured.

In co-pending U.S. patent application Ser. No. 145,798 filed May 19, 1994, entitled "Composite Laminate Beam for Automotive Body Construction," a hollow laminate beam characterized by high stiffness-to-mass ratio and having an outer portion which is separated from an inner tube by a thin layer of structural foam is described. In co-pending U.S. patent application Ser. No. 08/448,627, filed May 23, 1995, entitled "Composite Structural Reinforcement Member," a W-shaped carrier insert reinforcement which carries a foam body is described for use in reinforcing a hollow beam.

In addition, a number of metal laminates constructions are known in which flat metal plates are bonded together by an intervening layer of resin. It is also known to form a metal laminate sheet for use as a floor panel member which comprises a pair of flat metal sheets having an intervening layer of asphalt or elastic polymer.

Although filling the entirety of a section with plastic foam does significantly increase section stiffness (at least when high-density foams are utilized), they also increase mass and thus part weight, which, as stated, is an undesirable feature in automotive applications. Moreover, although increasing the metal gauge of a section or adding localized metal reinforcements will increase stiffness, as the metal thickness increases, it is more difficult to form the part due to limitations of metal forming machines. Importantly, in many applications increasing metal gauge will not work effectively because mass and stiffness are increased proportionately, with no resultant change in the dynamic stiffness frequency of the part.

Finally, filling a section entirely with foam may be prohibitively expensive, creates a large heat sink and requires elaborate sealing operations to close access holes in the stampings.

Accordingly, it would be desirable to provide a low-cost technique for reinforcing a hollow structural member without proportionately increasing the mass. The present invention provides sections which have increased strength with no moderate increases in mass and without the use of high volumes of expensive resins. In many applications, the present invention reduces vibrations which cause unwanted "shake" of a component which is primarily subjected to bending rather than torsion.

SUMMARY OF THE INVENTION

In one aspect the present invention provides a reinforced structural member for automotive applications. The reinforced structure is a hollow beam such as a rail section or the like having a pair of opposed inner surfaces. The hollow beam is reinforced through the use of a specially formed insert. The insert is a linear beam having two opposed plates which substantially span the width of the cavity defined by the walls of the hollow structural member. The opposed plates have generally planar surfaces. A layer of thermally expandable foam with adhesive properties is bonded to each of these planar surfaces. The insert is placed in the cavity of the hollow structural member such that the adhesive layers are adjacent the opposed inner surfaces of the hollow beam. The beam with the reinforcing insert is then heated to thermally activated the expandable adhesive layers. As the adhesive layers expand they bond securely to the inner surfaces of the hollow beam to form an integral structure, i.e. a structurally reinforced beam.

In one aspect the reinforcing insert of the present invention is wholly enclosed in the hollow structural member. In that aspect the insert is dropped into an open channel which is then closed with a top plate.

In one aspect the reinforcing insert of the present invention is an I-beam which is formed of metal, glass filled nylon or a cementatious material that contains microspheres.

Thus, in accordance with the present invention there is provided in one aspect a reinforced structural member, comprising a structural member defining a space, the structural member having two opposed walls; a reinforcing beam disposed in the space, the reinforcing beam having two opposed plates, each of the plates having a principal surface, the plates being separated by a predetermined distance with the principal surfaces being approximately parallel to one another and the plates being interconnected by an interconnecting structural spacing element; a first thermally expanded adhesive body disposed on one of the principal surfaces and a second thermally expanded adhesive body disposed on the other of the principal surfaces; and the first thermally expanded adhesive body being bonded to one of the walls of the structural member and the second thermally expanded adhesive body being bonded to the other of the walls of the structural members.

These and other advantages and objects of the present invention will now be more fully described with reference to the drawings.

DETAILED DESCRIPTION OF THE PREFERRED EMBODIMENTS OF THE INVENTION

Figure 1:
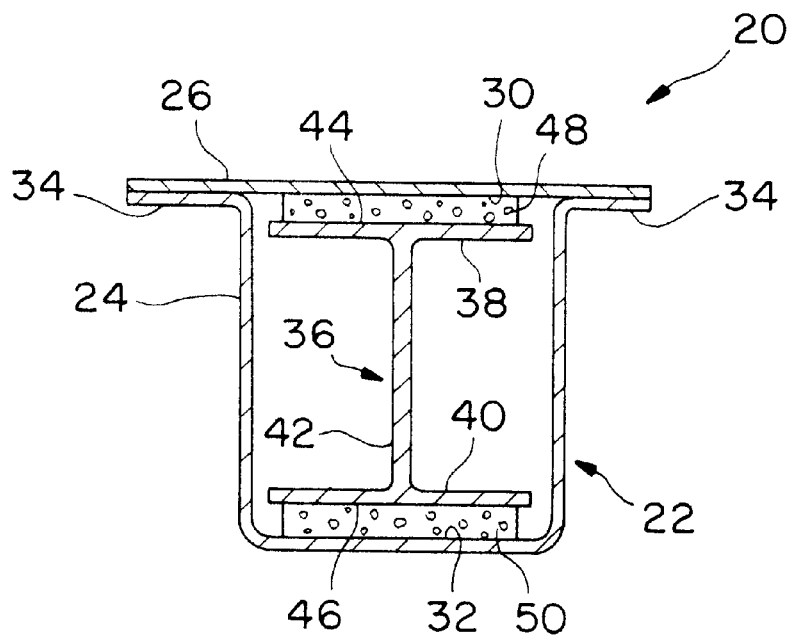
FIG. 1 is a cross section of a reinforced beam in accordance with the present invention in which the reinforcing insert has an I-beam configuration.

Referring now to FIG. 1 of the drawings, reinforced beam 20 is shown generally having hollow beam or structure 22 which will typically be a metal stamping for example a rail section of a motor vehicle frame. Accordingly, hollow beam 22 comprises a linear channel section 24 having metal top plate 26. For the purposes of this description hollow beam 22 will be referred to as having top surface or area 30 and bottom surface or area 32, but it is to be understood that the references to top and bottom are arbitrary and will depend on the geometry and orientation of the finished assembly. Top plate will generally be attached to section 214 at flanges 34 by spot welding or the like.

The advantages of the present invention are achieved through the use of a specialized reinforcement member which comprises reinforcing insert in this case I-beam 36 having a pair or opposed plates 38 and 40 which are connected by a spanning or spacer portion. web 42. Each plate has an associated principal surface shown here as principal surfaces 44 and 46. On each principal surface 44 and 46, a layer of thermally expanded adhesive foam 48 and 50 is disposed which functions both as a means for securing I-beam 36 in place and as a vibration dampening element. Although I-beam 36 may be straight, in many applications it may have various bends and slopes to match the geometry of the part which is being reinforced.

A number of resin-based compositions can be utilized to form adhesive foam layers 48 and 50 in the present invention The preferred compositions impart excellent strength, stiffness, and vibration dampening characteristics to beam 20 while adding only marginally to the weight. With specific reference now to the composition of adhesive foam layers 48 and 50, the density of the material should preferably be from about 20 pounds per cubic feet to about 40 pounds per cubic feet to minimize weight. The melting point, heat distortion temperature and the temperature at which chemical breakdown occurs must also be sufficiently high such that layers 48 and 50 substantially maintain there structure at high temperatures typically encountered in paint ovens and the like. Therefore, adhesive foam layers 48 and 50 layers should be able to withstand temperatures in excess of 400 degrees F. and preferably 350 degrees F. for short times. Also, adhesive foam layers 48 and 50 should be able to withstand heats of about 130 degrees F. to 210 degrees F. for extended periods without exhibiting substantial heat-induced distortion or degradation.

In more detail, in one particularly preferred embodiment adhesive foam layers 48 and 50 includes a synthetic resin, a cell-forming agent, and a filler. A synthetic resin comprises from about 50 percent to about 80 percent by weight, preferably from about 55 percent to about 70 percent by weight, and most preferably from about 55 percent to about 65 percent by weight of the material from which adhesive layers 48 and 50 are formed. As used herein, the term "cell-forming agent" refers generally to agents which produce bubbles, pores, or cavities in layers 48 and 50. That is, layers 48 and 50 have a cellular structure, having numerous cells disposed throughout their mass. This cellular structure provides a low-density, high-strength material, which, in reinforced beam 20, provides a strong, yet lightweight structure. Cell-forming agents which are compatible with the present invention include reinforcing "hollow" microspheres or microbubbles which may be formed of either glass or plastic. Plastic microspheres may be either thermosetting or thermoplastic and either expanded or unexpanded. In one embodiment, unexpanded microspheres are used which are then expanded to form adhesive foam layers 48 and 50. The preferred microspheres are from about 10 to about 400 and preferably from about 40 to about 100 microns in diameter. The cell-forming agent may also comprise a larger, lightweight material such as macrospheres of greater than 400 microns in diameter. Also, the cell-forming agent may comprise a blowing agent which may be either a chemical blowing agent or a physical blowing agent. Glass microspheres are particularly preferred. Where the cell-forming agent comprises microspheres or macrospheres, it constitutes from about 10 percent to about 40 percent by weight, preferably from about 15 percent to about 40 percent by weight, and most preferably from about 25 percent to about 40 percent by weight of the material which forms layers 48 and 50. Where the cell-forming agent comprises a blowing agent, it constitutes from about 1 percent to about 10 percent by weight. preferably from about 1 percent to about 8 percent by weight, and most preferably from about 1 percent to about 5 percent by weight of layers 48 and 50. Suitable fillers include glass or plastic microspheres, silica fume, calcium carbonate, milled glass fiber, and chopped glass strand. Glass microspheres are particularly preferred. Other materials may be suitable. A filler comprises from about 10 percent to about 50 percent by weight, preferably from about 15 percent to about 45 percent by weight and most preferably from about 20 percent to about 40 percent by weight of layers 48 and 50.

Preferred synthetic resins for use in the present invention include thermosets such as epoxy resins, vinyl ester resins, thermoset polyester resins, and urethane resins. It is not intended that the scope of the present invention be limited by molecular weight of the resin and suitable weights will be understood by those skilled in the arc based on the present disclosure. Where the resin component of the liquid filler material is a thermoset resin, various accelerators, such as "" and "2 Ethyl 4 Methyl Imidazole," and "benzyldimethylamine," and curing agents, preferably organic peroxides such as "DI-CY" and "low concentrations of amines or imidizoles." may also be included to enhance the cure rate. A functional amount of accelerator is typically from about 0.5 percent to about 3 percent of the resin weight with corresponding reduction in one of the three components, resin, cell-forming agent or filler. Similarly, the amount of curing agent used is typically from about 1 percent to about 8 percent of the resin weight with a corresponding reduction in one of the three components, resin, cell-forming agent or filler. Effective amounts of processing aids, stabilizers, colorants, UV absorbers and the like may also be included in layer. Thermoplastics may also be suitable.

In the following tables, preferred formulations for adhesive foam layers 48 and 50. It has been found that these formulations provide a layers 48 and 50 which result in a reinforced beam 20 having excellent structural properties. All percentages in the present disclosure are percent by weight unless otherwise specifically designated.

| INGREDIENT | PERCENTAGE BY WEIGHT |
|---|---|
| FORMULA I | |
| PEP 6134 | 68.5 |
| EMI-24 | 1.2 |
| Fumed Silica | 4.0 |
| DI-CY | 4.3 |
| Celogen OT | 0.8 |
| B38 | 22.2 |
| FORMULA II | |
| PEP 6134 | 60.5 |
| DI-CY | 4.8 |
| DMP3O | 1.2 |
| Celogen AZ | 1.5 |
| B38 | 32.0 |

Figure 2:
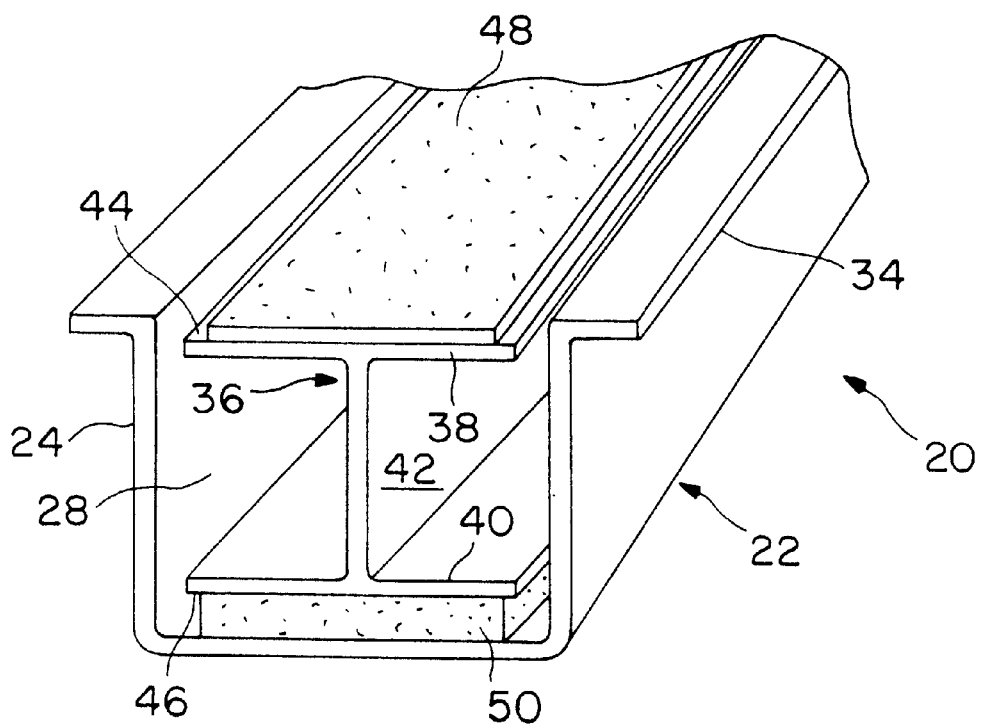
FIG. 2 is a perspective view of the reinforced beam of FIG. 1 with the top plate removed to reveal the insert beam.

Referring again to FIGS. 1 and 2 of the drawings, foam layers 48 and 50 preferably cover substantially the entirety of principal surfaces 44 and 46, for example at least 80% thereof, and most preferable are limited to principal surfaces 44 and 46. i.e., in the most preferred embodiment layers 48 and 50 do not extend beyond the edges of principal surfaces 48 and 50. In some applications, however, it may be desirable to cover less than 80% of principal surfaces 44 and 46 with foam layers 48 and 50 or to extend them beyond the edges of principal surfaces 48 and 50. As shown in FIGS. 1 and 2, I-beam 36 is a unitary structure which may be roll formed steel or which may comprise extruded aluminum, or in one preferred embodiment, glass filled nylon. Other materials may be suitable in a given application. Although it is not intended to limit the full scope of the resent invention by any specific dimensions, the thickness of the walls of I-beam 36 will typically be from about 0.8 to about 1.0 mm. The length of interconnecting web 42 will typically be about 1 in. to about 1 ft., and the width of principal surfaces 44 and 46 will each be about 0.3 in. to about 10 ft. The length of I-beam 36 will typically be from about 6 in. to about 10 ft. The thickness of each layer 48 and 50 is preferably from about 3 to about 6 mm as fully expanded. This represents an expansion of the material as reinforced beam 20 is heated of about 50 to about 100 percent by volume. It is preferred that the edges of plates 38 and 40 be spaced apart from the inner sidewalls of section 24 by about 5 to about 8 mm.

Adhesive layers 48 and 50 are most preferably pre-formed as ribbons or sheets by extrusion of the preferred resin-based mixture through an appropriate die. The ribbon is then cut to length such that pieces are formed that fit on principal surfaces 44 and 48. The pre-cut strips have sufficient tack to adhere well to principal surfaces 44 and 46 so that an additional adhesive is generally not necessary.

Figure 3:
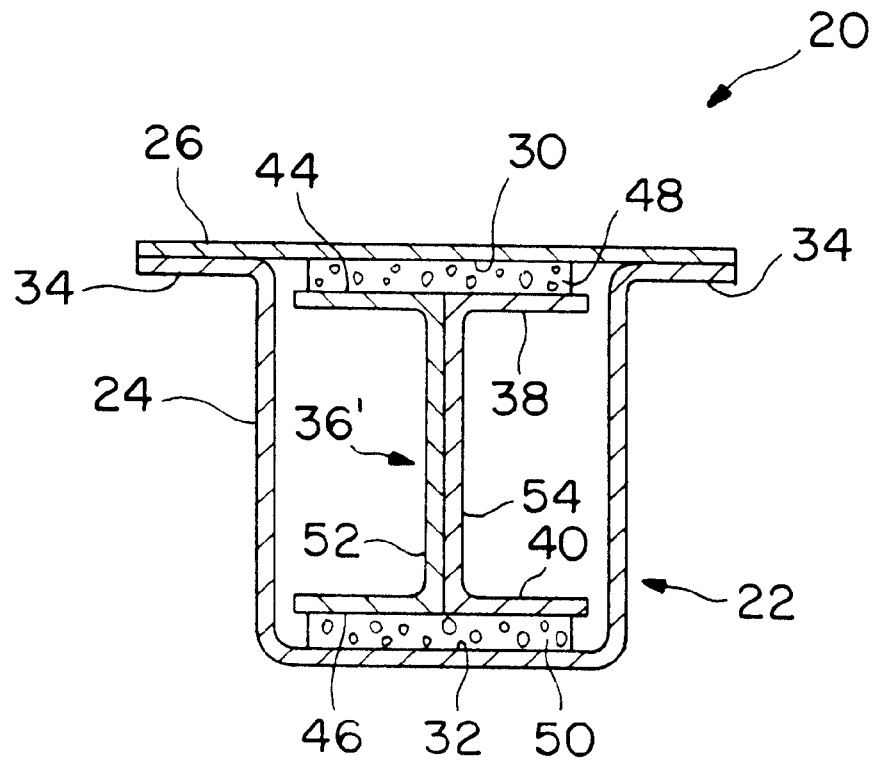
FIG. 3 is a cross section of a reinforced beam in accordance with the present invention in which the reinforcing, insert has an I-beam configuration wherein the I-beam is constructed of two mating sections.

Referring now to FIG. 3 of the drawings, I-beam 36' is shown as comprising to separate C shaped channel pieces 52 and 54. Channel pieces 52 and 54 may be extruded aluminum, glass filled nylon or stamped or roll formed steel. Channel pieces 52 and 54 may be attached together as shown in the drawing by a number methods, for example spot welding or the like. Other than the two-piece construction of I-beam 36'. the reinforced beam of FIG. 3 is essentially identical to the structure described in connection with FIGS. 1 and 2 and, accordingly, like reference numerals designate like parts.

Figure 4:
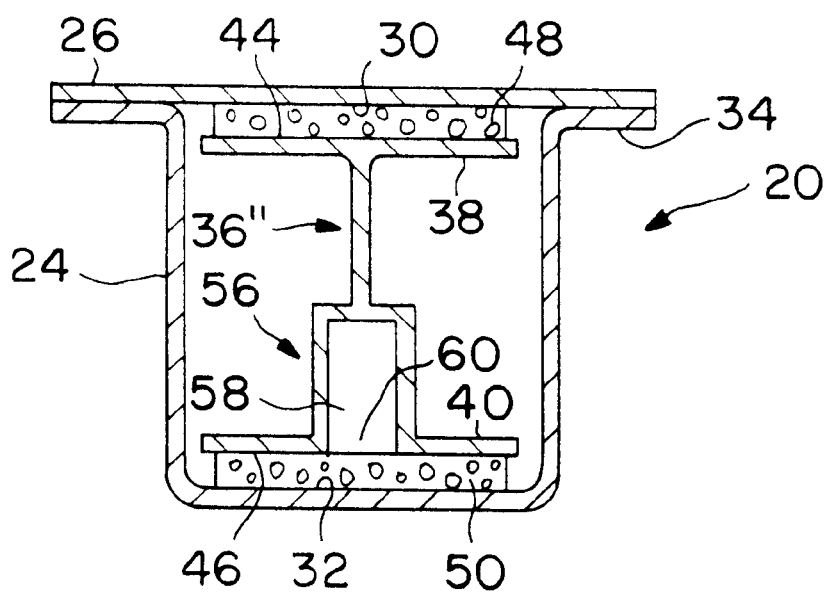
FIG. 4 is a cross section of a reinforced beam in accordance with the present invention in which the reinforcing insert has a partial double web configuration.

Referring now to FIG. 4 of the drawings I-beam 36" is shown which includes double web portion 56 that defines double web channel 58 at space 60 of plate 40'. I-beam 36" is preferably formed of extruded aluminum or glass filled nylon. In some applications it may be desirable to construct I-beam 36" with two double web potions, i.e. one in association with each plate 38', 40. Again, other than the geometry of I-beam 36", the reinforced beam of FIG. 3 is made in accordance with the description provided for FIGS. 1 and 2 herein.

Figure 5:
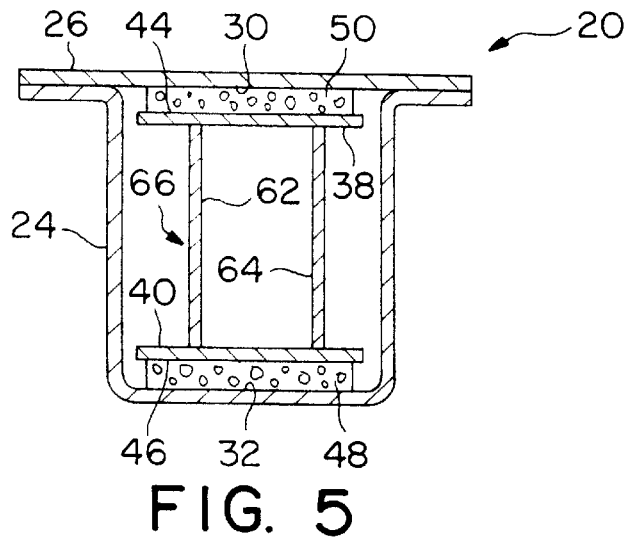
FIG. 5 is a cross section of a reinforced beam in accordance with the present invention in which the reinforcing insert has a full double web configuration.
Figure 6:
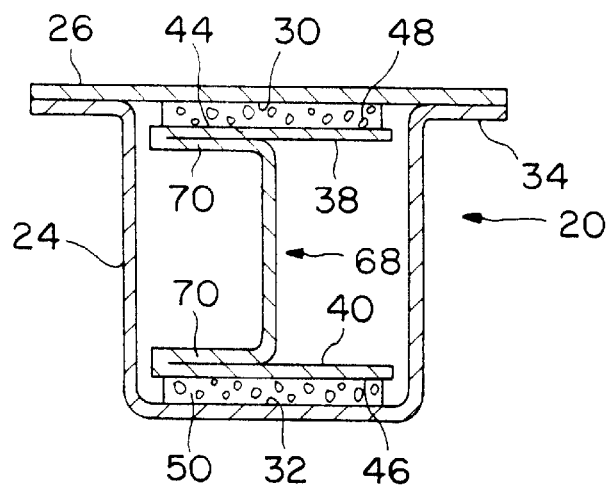
FIG. 6 is a cross section of a reinforced beam in accordance with the present invention in which the reinforcing insert has an I-beam configuration constructed as a dual fold structure.

In FIG. 5, webs 62 and 64 form a web pair in double web reinforcing insert 66. Double web insert 66 is preferably formed of extruded aluminum or glass filled nylon. Webs 62 and 64 preferable extend the entire length of double web reinforcing insert 66. In FIG. 6 of the drawings still another configuration of the present invention is shown in which folded reinforcing insert 68 has fold regions 70. Folded reinforcing insert 68 is roll formed metal.

Figure 7:
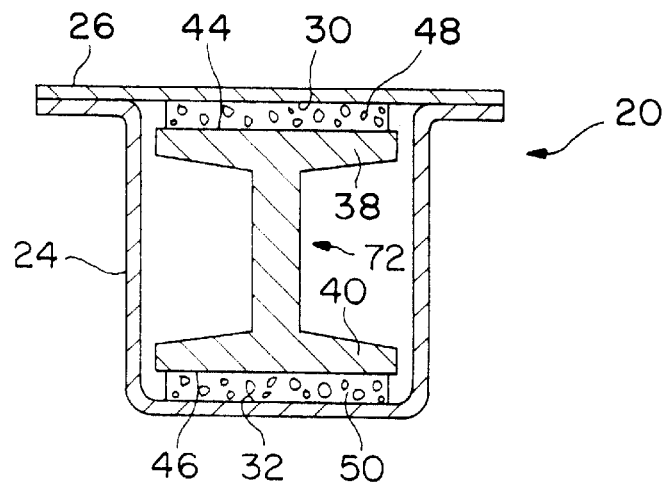
FIG. 7 is a cross section of a reinforced beam in accordance with the present invention in which the reinforcing inset has an I beam configuration wherein the I-beam is a cast cementatious structure.

Referring now to FIG. 7 of the drawings, I-beam 2 is shown which is formed by casting a foam cement material. More specifically, it has been found that a Portland cement-based I-beam 72 is desirable for use in the present invention. The Portland cement-based material has a combination of microspheres or macrospheres, cement, water and silica fume.

In the following tables, preferred formulations for the cement-water based mixes for I-beam 72 are set forth.

| INGREDIENT | FORMULA I (STANDARD MIX) (PARTS BY WEIGHT) | FORMULA II (LIGHTWEIGHT MIX) (PARTS BY WEIGHT) |
|---|---|---|
| Cement | 54% | 54% |
| Water | 24% | 24% |
| Density Dry Cement Mix | 40 PCF | 40 PCF |
| Density Wet Cement Mix | 56 PCF | 40 PCF |

The standard mix is made with an equal volume of cement, Portland Type 1A or Type 1, as defined in the book of the Portland Cement Association entitled "Design and Control of Concrete Mixtures." Eleventh Edition (Library of Congress catalog card number 29-10592) and an equal volume of microspheres.

The bulk of the density of the Portland Type 1A cement is approximately 75 to 80 pounds per cubic feet. The bulk density of the microspheres is 15 pounds per cubic feet. By combining the two in equal amounts, the specific gravity of the combined mix dry is 25 to 40 pounds per cubic feet of approximately one half the weight of the cement.

The amount of water added to the mix is between 35 to 50 percent of the weight of the cement. Thus, if the mix has 800 grams of cement, 400 grams of water would be added. The mix has 220 to 650 grams of the microspheres.

The Portland Cement microspheres combination is improved in its moisture resistance characteristic by the addition of silica fume. Silica fume is a dust material collected from flu gas stacks. The silica dust are tiny inert particles, 15 microns in diameter. When the silica inert particles are added to the dry cement mix, the particles clog the interstitial spaces between the cement particles and the microballons. The silica fume particles clog the pores between the cement and thereby vastly improve the moisture resistance of the cured product. The amount of silica fume added is from about 10 to 20 percent by weight of cement.

There are two versions of silica fume, one treated and the other one not treated. The treated silica fume has a plasticizer which also lubricates the mix and reduces the water content further.

To increase the moisture resistance of the finished product, other materials can be used in place of the silica fume. These are water born materials such as a latex manufactured by Dow Chemical Co. of Midland, Mich., or a water base urethane, acrylic, or epoxy. Such materials have the characteristic of clotting the inner spaces between the cement particles. Silica fume will actually combine chemically with the cement and will improve the properties of the cement. The latex does not chemically combine with the cement, but it can be used to clot the cement pores and thereby reduce the water to cement ratio. The water base urethane, acrylic and epoxies produce the same result of clotting as a latex or silica fume.

While particular embodiments of this invention are shown and described herein, it will be understood, of course, that the invention is not to be limited thereto since many modifications may be made, particularly by those skilled in this art, in light of this disclosure. It is contemplated, therefore, by the appended claims, to cover any such modifications as fall within the true spirit and scope of this invention.

What is claimed is:

1. A reinforced structural member, comprising;
   a structural member defining a space, said structural member being made of a metal material, said structural member being in the form of a channel which forms said space, said structural member including a cap spanning said channel to form a covering wall of said structural member, said structural member further having at least two opposed walls which form said channel;
   a reinforcing beam disposed in said space, said reinforcing beam having two opposed plates, each of said plates having a principal surface, said plates being separated by a predetermined distance, said plates being interconnected by an interconnecting structural spacing element;
   a first thermally expanded structural foam adhesive body disposed on one of said principal surfaces and a second thermally expanded structural foam adhesive body disposed on the other of said principal surfaces; and
   said first thermally expanded structural foam adhesive body being bonded to one of said walls of said structural member and said second thermally expanded structural foam adhesive body being bonded to another of said walls of said structural member for reinforcing said structural member.

2. The reinforced structural member recited in claim 1, wherein said principal surfaces of said reinforcing beam extend substantially entirely the length of said reinforcing beam which requires reinforcing.

3. The reinforced structural member recited in claim 1, wherein said first and second adhesive bodies cover substantially the entire surface of said principal surfaces.

4. The reinforced structural member recited in claim 1, wherein said principal surfaces are planar surfaces.

5. The reinforced structural member recited in claim 4, wherein said adhesive bodies comprise planar ribbons of thermally expanded adhesive.

6. The reinforced structural member recited in claim 1, wherein said reinforcing beam comprises an I beam.

7. The reinforced structural member recited in claim 1, wherein said reinforcing beam is roll formed metal.

8. The reinforced structural member recited in claim 1, wherein said interconnecting structural spacing element of said reinforcing beam is a c-shaped structure defining a channel.

9. The reinforced structural member recited in claim 1, wherein said reinforcing beam is a pair of mated c-shaped channels which are connected to one another to from an I beam.

10. The reinforced structural member recited in claim 7, wherein said roll-formed metal is steel.

11. The reinforced structural member recited in claim 1, wherein said reinforcing beam is extruded aluminum.

12. The reinforced structural member recited in claim 1, wherein said adhesive bodies are limited to the area of said principal surfaces.

13. The reinforced structural member recited in claim 6, wherein same I beam comprises two stamped metal C channels spot welded together.

14. The reinforced structural member recited in claim 1, wherein said adhesive bodies two part air-cured adhesive.

15. The reinforced structural member recited in claim 1, wherein said adhesive bodies are one part adhesive.

16. The member of claim 6, wherein said I beam is metal.

17. An insert for a hollow structural beam, said insert comprising:
   an I beam having two opposed plates, each of said plates having a principal surface;
   a first thermally expanded planar adhesive body disposed on one of said principal surfaces;
   a second thermally expanded planar adhesive body disposed on the other of said principal surfaces;
   wherein said adhesive bodies are foam: and wherein said I beam is glass filled nylon.

18. A reinforced structural member, comprising:
   a structural member defining a space said structural member having two opposed walls;
   a reinforcing beam disposed in said space, said reinforcing beam having two opposed plates, each of said plates having a principal surface, said plates being separated by a predetermined distance, said principal surfaces being approximately parallel to one another, said plates being interconnected by an interconnecting structural spacing element;

a first thermally expanded adhesive body disposed on one of said principal surfaces and a second thermally expanded adhesive body disposed on the other of said principal surfaces; and said first thermally expanded adhesive body being bonded to one of said walls of said structural member and said second thermally expanded adhesive body being bonded to another of said walls of said structural member; and wherein at least one of said principal surfaces is discontinuous such that a longitudinal space is formed therein.

19. The reinforced structural member recited in claim 18, wherein interconnecting structural spacing element defines a pair of parallel opposed linear walls which form a bridge at said longitudinal space.

20. A reinforced structural member, comprising:

a structural member defining a space, said structural member having two opposed walls;

a reinforcing beam disposed in said space, said reinforcing beam having two opposed plates, each of said plates having a principal surface, said plates being separated by a predetermined distance, said principal surfaces being approximately parallel to one another, said plates being interconnected by an interconnecting structural spacing element;

a first thermally expanded adhesive body disposed on one of said principal surfaces and a second thermally expanded adhesive body disposed on the other of said principal surfaces; and said first thermally expanded adhesive body being bonded to one of said walls of said structural member and said second thermally expanded adhesive body being bonded to another of said walls of said structural member; and wherein said interconnecting structural spacing element is a pair of parallel side walls.

21. A reinforced structural member, comprising:

a structural member defining a space, said structural member having two opposed walls;

a reinforcing beam disposed in said space, said reinforcing beam having two opposed plates, each of said plates having a principal surface, said plates being separated by a predetermined distance, said principal surfaces being approximately parallel to one another, said plates being interconnected by an interconnecting structural spacing element;

a first thermally expanded adhesive body disposed on one of said principal surfaces and a second thermally expanded adhesive body disposed on the other of said principal surfaces; and said first thermally expanded adhesive body being bonded to one of said walls of said structural member and said second thermally expanded adhesive body being bonded to another of said walls of said structural member; and wherein said reinforcing beam is glass filled nylon.

22. A reinforced structural member, comprising:

a structural member defining a space, said structural member having two opposed walls;

a reinforcing beam disposed in said space, said reinforcing beam having two opposed plates, each of said plates having a principal surface, said plates being separated by a predetermined distance, said principal surfaces being approximately parallel to one another, said plates being interconnected by an interconnecting structural spacing element;

a first thermally expanded adhesive body disposed on one of said principal surfaces and a second thermally expanded adhesive body disposed on the other of said principal surfaces; and said first thermally expanded adhesive body being bonded to one of said walls of said structural member and said second thermally expanded adhesive body being bonded to another of said walls of said structural member; and wherein reinforcing beam is a cementitions material.

23. The reinforced structural member recited in claim 22, wherein said cementitions material contains microspheres and cement.

24. The reinforced structural member recited in claim 22, wherein said reinforcing beam is formed by casting said cementitions material to form an I beam.

25. An insert for a hollow structural beam, said insert comprising:

an I beam having two opposed plates, each of said plates having a principal surface;

a first thermally expanded planar adhesive body disposed on one of said principal surfaces;

a second thermally expanded planar adhesive body disposed on the other of said principal surfaces;

wherein said adhesive bodies are foam: and wherein said I beam is a cast cementations material.

26. The insert recited in claim 25, wherein said adhesive bodies are foamed adhesive.

27. A method of reinforcing a hollow structural member having top and bottom walls, comprising the steps of:

providing an insert, said insert including a reinforcing beam, said reinforcing beam having a pair of opposed plates, each of said opposed plates having a principal surface;

extruding a ribbon-shaped thermally expandable adhesive body bonded;

cutting said ribbon shaped thermally expandable body into lengths which are about the same area as said principal surfaces of said opposed plates;

placing one of said cut lengths of said thermally expandable body on each of said principal surfaces such that said thermally expandable bodies are adhesively attached to said principal surfaces;

placing said insert inside said hollow structural member such that one of said adhesive bodies is adjacent said top of said hollow structural member and the other of said adhesive bodies is adjacent said bottom of said hollow structural member; and heating said hollow structural member and said insert to thermally expand said adhesive bodies and to bond said one of said adhesive bodies to said top of said hollow structural member and to bond said other of said adhesive bodies to said bottom of said structural member.

28. A reinforced structural member, comprising:

a structural member defining a space, said structural member having two opposed walls;

a reinforcing beam disposed in said space, said reinforcing beam having two opposed plates, each of said plates having a principal surface, said plates being separated by a predetermined distance, said plates being interconnected by an interconnecting structural spacing element, said reinforcing beam is glass filled nylon;

a first thermally expanded adhesive body disposed on the principal surface of one of said plates and a second thermally expanded adhesive body disposed on the principal surface of the other of said plates;

said first thermally expanded adhesive body being bonded on one of said walls of said structural member and said second thermally expanded adhesive body being bonded to the other of said walls of said structural members; and wherein said adhesive bodies contain microspheres.

29. A reinforced structural member, comprising:

a structural member defining a space, said structural member having two opposed walls;

a reinforcing beam disposed in said space, said reinforcing beam having two opposed plates, eat of said plates having a principal surface, said plates being separated by a predetermined distance, said plates being interconnected by an interconnecting structural spacing element, a first thermally expanded adhesive body disposed on the principal surface of one of said plates and a second thermally expanded adhesive body disposed on the principal surface of the other of said plates;

said first thermally expanded adhesive body being bonded on one of said wall of said structural member and said second thermally expanded adhesive body being bonded to the other of said walls of said structural members; and wherein said adhesive bodies contain microspheres, and wherein said reinforcing beam is a cementitions material.

30. An insert for a hollow structural beam, said insert comprising:

an I beam having two opposed plates, each of said plates having a principal surface;

a first thermally expanded planar adhesive body disposed on one of said principal surfaces;

a second thermally expanded planar adhesive body disposed on the other of said principal surfaces;

wherein said adhesive bodies are foam; and wherein said I beam is glass filled nylon.

31. The insert for a hollow structural beam recited in claim 30, wherein said I beam is metal.

32. The insert recited in claim 30, wherein said I beam is a cast cementitions material.

33. The insert recited in claim 30, wherein said adhesive bodies are foamed adhesive.

34. A reinforced structural member, comprising:

a structural member defining a space, said structural member having two opposed walls;

a reinforcing beam disposed in said space, said reinforcing beam having two opposed plates, each of said plates having a principal surface, said plates being separated by a predetermined distance, said plates being interconnected by a interconnecting structural spacing element;

a first thermally expanded adhesive body disposed on the principal surface of one of said plates and a second thermally expanded adhesive body disposed on the principal surface of the other of said plates;

said first thermally expanded adhesive body being bonded to one of said walls of said structural member and said second thermally expanded adhesive body being bonded to the other of said walls of said structural members; and wherein said reinforcing beam is glass filled nylon.

35. A reinforced structural member, comprising:

a structural member defining a space, said structural member having two opposed walls;

a reinforcing beam disposed in said space, said reinforcing beam having two opposed plates, each of said plates having a principal surface, said plates being interconnected by an interconnecting structural spacing element;

said first thermally expanded adhesive body being bonded to one of said walls of said structural member and said second thermally expanded adhesive body being bonded to the other of said walls of said structural members; and wherein said reinforcing beam is a cementitions material containing microspheres and cement.

36. A reinforced structural member, comprising:

a structural member having a plurality of walls with a channel shaped inner surface formed by said walls to define a space, a reinforcing beam disposed in said space, said reinforcing beam being of differing shape than the shape of said channel shaped inner surface, said reinforcing beat being non-uniformly spaced from said channel shaped inner surface, said reinforcing beam having two opposed plates, each of said plates having a principal surface, said plates being separated by a predetermined distance, said plates being interconnected by an interconnecting structural spacing element;

a first thermally expanded structural foam adhesive body disposed on one of said principal surfaces and a second thermally expanded structural foam adhesive body disposed on the other of said principal surfaces;

said first thermally expanded structural foam adhesive body being bonded to one of said walls of said structural member and said second thermally expanded structural foam adhesive body being bonded to another of said walls of said structural member for reinforcing said structural member, and open spaces in said structural member between said inner surface and said reinforcing beam and said expanded structural foam.

37. The reinforced structural member recited in claim 36, wherein said principal surfaces of said reinforcing beam are co-extensive with said reinforcing beam.

38. The reinforced structural member recited in claim 36, wherein said first and second adhesive bodies cover substantially the entirety of said principal surfaces.

39. The reinforced structural member recited in claim 36, wherein said principal surfaces are planar surfaces.

40. The reinforced structural member recited in claim 39, wherein said adhesive bodies comprise planar ribbons of thermally expanded adhesive.

41. The reinforced structural member recited in claim 36, wherein said reinforcing beam comprises an I beam.

42. The reinforced structural member recited in claim 36, wherein said reinforcing beam is roll formed metal.

43. The reinforced structural member recited in claim 36, wherein said interconnecting structural spacing element of said reinforcing beam is a c-shaped structure defining a channel.

44. The reinforced structural member recited in claim 36, wherein said reinforcing beam is a pair of mated c-shaped channels which are connected to one another to form an I beam.

45. The reinforced structural member recited in claim 36, wherein at least one of said principal surfaces is discontinuous such that a longitudinal space is formed therein.

46. The reinforced structural member recited in claim 45, wherein interconnecting structural spacing element defines a pair of parallel opposed linear walls which form a bridge at said longitudinal space.

47. The reinforced structural member recited in claim 36, wherein said interconnecting structural spacing element is a pair of parallel side walls.

48. The reinforced structural member recited in claim 42 wherein said roll-formed metal is steel.

49. The reinforced structural member recited in claim 36, wherein said reinforcing beam is extruded aluminum.

50. The reinforced structural member recited in claim 36, wherein said adhesive bodies are limited to said principal surfaces.

51. The reinforced structural member recited in claim 29, wherein said reinforcing beam is formed by casting said cementatious material to form an I beam.

52. The reinforced structural member recited in claim 41, wherein same I beam comprises two stamped metal C channels spot welded together.

53. The reinforced structural member recited in claim 36, wherein said adhesive bodies include a two part air-cured adhesive.

54. The reinforced structural member recited in claim 36, wherein said adhesive bodies are one part adhesive.

* * * * *